United States Patent [19]

Trimmer et al.

[11] 4,420,863

[45] Dec. 20, 1983

[54] CANE CRUSHING APPARATUS

[75] Inventors: Raymond W. Trimmer, Oatley; Morris B. McCullagh, Double Bay, both of Australia

[73] Assignee: Polymex Pty. Limited, Sydney, Australia

[21] Appl. No.: 282,093

[22] Filed: Jul. 10, 1981

[30] Foreign Application Priority Data

Jul. 10, 1980 [AU] Australia .............................. PE4464

[51] Int. Cl.[3] ........................ A01B 29/00; B21B 31/08

[52] U.S. Cl. ...................................... 29/121.5; 29/125; 241/236

[58] Field of Search .................... 29/121.1, 121.5, 125, 29/130; 241/221, 222, 236, 295

[56] References Cited

U.S. PATENT DOCUMENTS 3,931,935 1/1976 Helman ........................... 241/236 X
3,960,335 6/1976 Haberle ........................... 241/221 X
4,260,115 4/1981 Hatanaka ............................ 241/236

*Primary Examiner*—Carl E. Hall
*Attorney, Agent, or Firm*—Cushman, Darby & Cushman

[57] ABSTRACT

A feed roller for a sugar crushing mill said roller having a central shaft from which radially extend a plurality of discs which are co-axially mounted on the shaft, a plurality of teeth formed on each disc, and a plurality of annular spacers co-axial with the shaft and holding the discs in a longitudinally spaced relationship.

6 Claims, 3 Drawing Figures

CANE CRUSHING APPARATUS

The present invention relates to apparatus to crush sugar cane, and more particularly but not exclusively, to feed rollers for a multi roller mill adapted to crush sugar.

Previous feed rollers employed in the field of crushing sugar have consisted of a pair of rollers of extremely heavy construction since each is formed of a generally solid cylindrical body, with teeth extending from the longitudinal peripheral surface. Due to the size and weight of these rollers they have been extremely difficult and expensive to manufacture, while additionally their weight inhibits their transport, installation and easy adjustment.

It is an object of the present invention to overcome or substantially ameliorate the above disadvantages.

There is disclosed herein a roller for a feed mechanism of a mill, said roller consisting of a central shaft, a plurality of discs coaxial with the shaft and extending radially therefrom, said discs being longitudinally spaced along the shaft, and wherein the radially outer peripheral surfaces of the discs are formed so as to provide a plurality of radially extending teeth.

Figure 1:
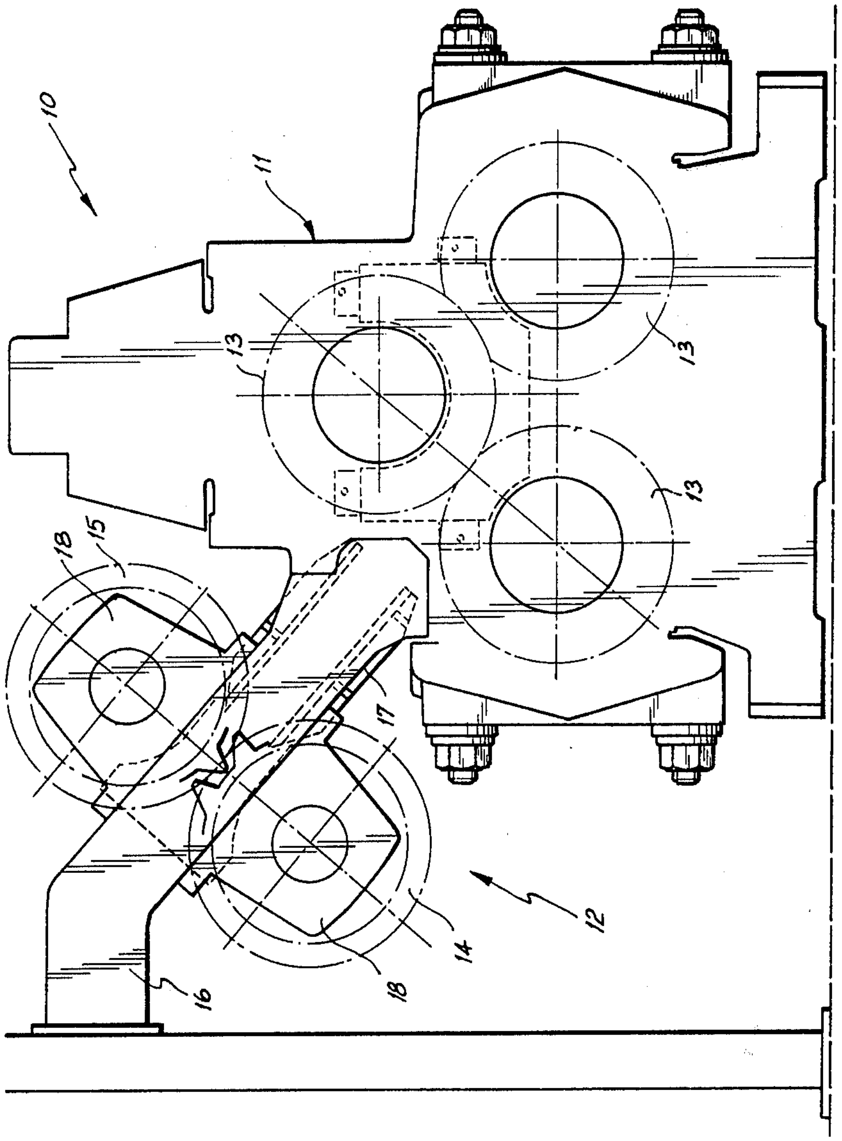
Figure 2:
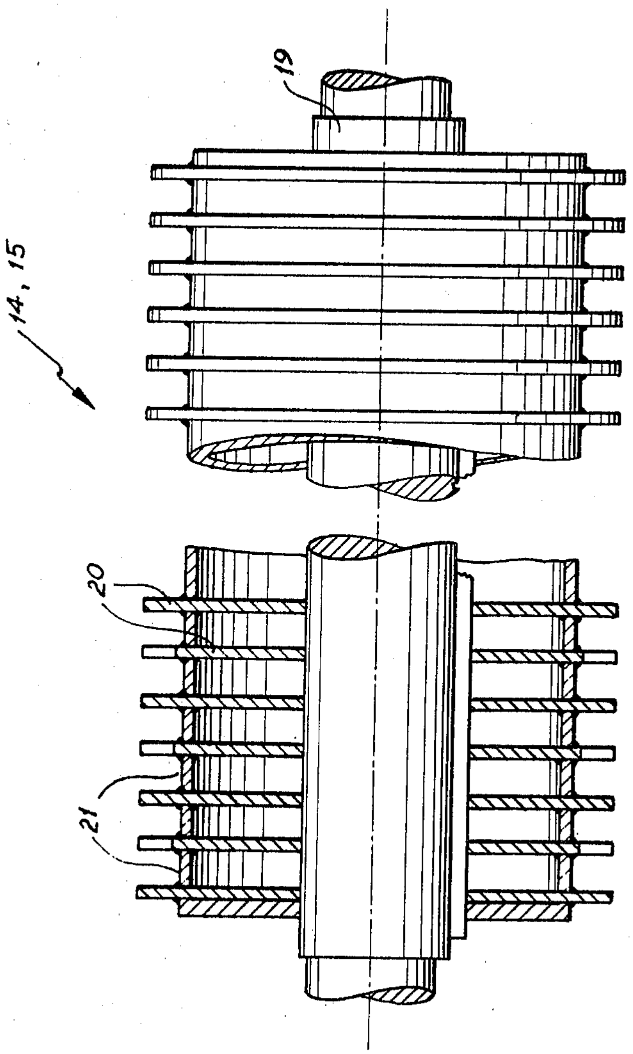
Figure 3:
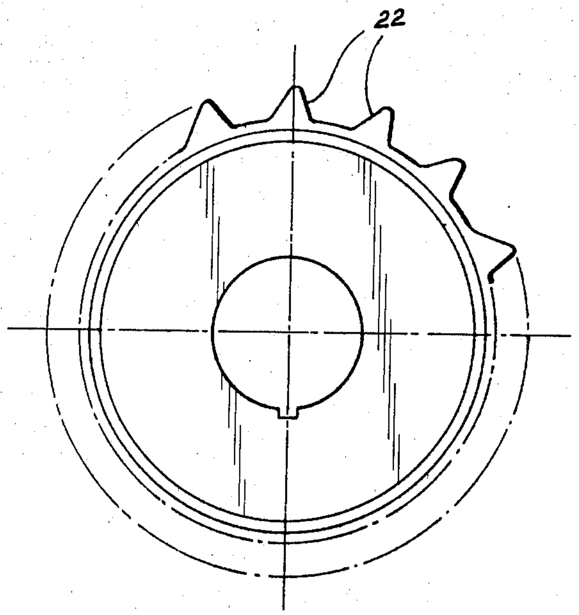

A preferred form of the present invention will now be described by way of example with reference to the accompanying drawings, wherein:

FIG. 1 schematically depicts an arrangement to crush sugar, said arrangement including a crushing mill and feed mechanism;

FIG. 2 is a partly sectioned side elevation of a roller used in the feed mechanism of FIG. 1; and FIG. 3 is an end elevation of the roller of FIG. 2.

The arrangement 10 of FIG. 1 includes a multi-roller crushing mill 11 and a feed mechanism 12 for the mill 11. The mill 11 includes three rollers 13 which receive sugar cane from the feed mechanism 12 and crush it so as to extract the sugar bearing liquid from the sugar cane.

The feed mechanism 12 includes two driven rollers 14 and 15 which receive the sugar from an inlet chute 16 and feed the sugar cane via the outlet chute 17 to the nip of the rollers 13.

The two rollers 14 and 15 are mounted in bearing housings 18 which are generally fixed relative to each other and supported by an overall frame not depicted. The chute 17 extends generally to a position adjacent the rollers 14 and 15 and delivers the sugar cane to a position adjacent the rollers 13.

The rollers 14 and 15 are more fully depicted in FIGS. 2 and 3 wherein it can be seen that the rollers 14 and 15 are constructed so as to each include a shaft 19 from which radially extend a plurality of equally spaced coaxial discs 20. The discs 20 are keyed to the shaft 19 so as to rotate therewith. The discs are further secured together by means of annular rings 21 which may be welded to the discs at locations radially spaced from the shaft 19. The radially outer peripheral surface of each of the discs 20 is formed so as to define a plurality of teeth 22 which extend generally radially with respect to the shaft 19.

The above described rollers may be totally constructed from mild steel discs and rings which may vary in number according to the particular application. Additionally the discs may be keyed or shrunk on to the shaft to thereby prevent movement of the shaft relative to the discs so that the shaft may impart a driving motion to the discs. The teeth may be cut on the discs, and if so desired, may be surface hardened so as to resist wear. The teeth are provided so as to ensure a positive grip on the sugar cane.

Owing to the light weight of the above described rollers, and to the fact that the setting between the rollers remains constant, to handle a specific cane flow rate, the two rollers may be supported in a fixed position in roller bearings securely bolted to opposite sides of a box-type girder, one end of each is bolted and welded in a suitable manner to the multi-roller mill.

Additionally the chutes 16 and 17 may be shaped at their extremities adjacent the rollers 14 and 15 so as to have fingers which extend between the discs 20. Additionally, by reducing the weight of the rollers 14 and 15 it is possible to mount them on a single beam with no setting adjustments and further to fit the chute 17 so as to have a minimum length to so reduce any friction loading.

What we claim is:

1. Apparatus for feeding sugar cane to a sugar cane crushing mill, said apparatus comprising a pair of opposed rotatable feeder rollers, on inlet chute to feed sugar cane between said feeder rollers and an outlet chute to direct sugar cane from said feeder rollers to the intake of the crushing mill, each of said feeder rollers having a central shaft, a plurality of disks coaxial with said shaft and extending radially therefrom, said disks being longitudinally spaced along each said shaft; said disks having outer radial peripheral surfaces which are provided with a plurality of spaced radially extending teeth of dimensions suitable to impel the sugar cane between said feeder rollers and through said outlet chute to the intake of said crushing mill, said pair of opposed feeder rollers being separated in the region of the nip thereof such that arcs described by the outer radial periphery of the teeth of one of said feeder rollers overlaps the arc described by the outer radial periphery of the teeth of the other of said feeder rollers, said opposed feeder rollers being mounted to rotate synchronously with the teeth of one of said opposed feeder rollers intermeshing between but without contacting the teeth of the other of said feeder rollers.

2. The apparatus as claimed in claim 1 wherein each said tooth has a leading face, a trailing face, and two substantially flat side faces, said leading face being curved away from the direction of roller rotation at that site and the separation between said leading face and said trailing face decreasing upwardly from the roller surface.

3. The apparatus as claimed in claim 1 wherein each feeder roller further includes a plurality of spacers with one spacer being located between each two adjacent disks and wherein the spacers are located radially outwardly of the respective shaft.

4. The apparatus as claimed in claim 3 wherein said spacers are generally annular in configuration and mounted so as to be coaxial with said shaft.

5. The apparatus as claimed in claim 4 wherein said shaft, disks and spacers are constructed from steel, with the disks being fitted to said shaft and the spacers welded to said disks.

6. The apparatus as claimed in claim 1 wherein the inlet chute and the outlet chute are shaped at their extremeties adjacent said feeder rollers so as to provide fingers extending between the teeth on said feeder rollers to remove debris adhering to said feeder rollers.

* * * * *